INVENTOR.
Gerhard K. Haas
BY
Hugh L. Fisher
ATTORNEY

United States Patent Office 3,144,540
Patented Aug. 11, 1964

3,144,540
ELECTRICAL STOCK REMOVAL APPARATUS
Gerhard K. Haas, Berkley, Mich., assignor to General Motors Corporation, Detroit, Mich., a corporation of Delaware
Filed July 13, 1961, Ser. No. 123,829
8 Claims. (Cl. 219—69)

The invention relates to improvements in electrical stock removal apparatus.

In the process employing electrical stock removal apparatus, and commonly referred to as Electrical Discharge Machining, highly combustible gases are often formed during the machining process particularly when relatively large workpieces are being machined. Since the electrical discharges produce sparks, the necessary elements for an explosion are present. This not only constitutes a safety hazard but also could result is damage to and even in the some cases complete destruction of the workpiece and equipment.

The explosion danger is even more pronounced when so-called thru-openings in dies are being machined, for it is preferable to have the flow of clean dielectric fluid to the gap to be in the direction stock is removed from the workpiece so that the machined surfaces are not exposed to contaminated dielectric fluid containing eroded particles. Otherwise, the contaminated dielectric fluid would produce so-called secondary erosion of the machined surfaces such that the machined surfaces become tapered and the finished dimensions are inaccurate. From the gap, the contaminated dielectric fluid and the gaseous formations flow through the opening and if allowed in some way to become entrapped, an explosion can occur. This presents the problem of removing the gases without producing an explosion.

With these problems in mind, the invention contemplates electrical stock removal apparatus having a unique flow system for expeditiously withdrawing contaminated ionized fluid along with any gaseous formations from a machining gap so that the danger from explosion is eliminated.

More particularly, the invention seeks to provide a flow system in which clean dielectric fluid is delivered to a gap in a direction corresponding to the direction stock is being removed from a workpiece and thereafter is quickly withdrawn along with any gas formations, which are effectively dissipated.

A related and more specific aim of the invention is to provide a novel dielectric fluid flow system in which both contaminated dielectric fluid containing eroded particles and gaseous formations is withdrawn from the machining gap area and thereafter separated with the gas formations being dissipated and the contaminated dielectric fluid returned to the system where it is filtered and again used.

Figure 1:
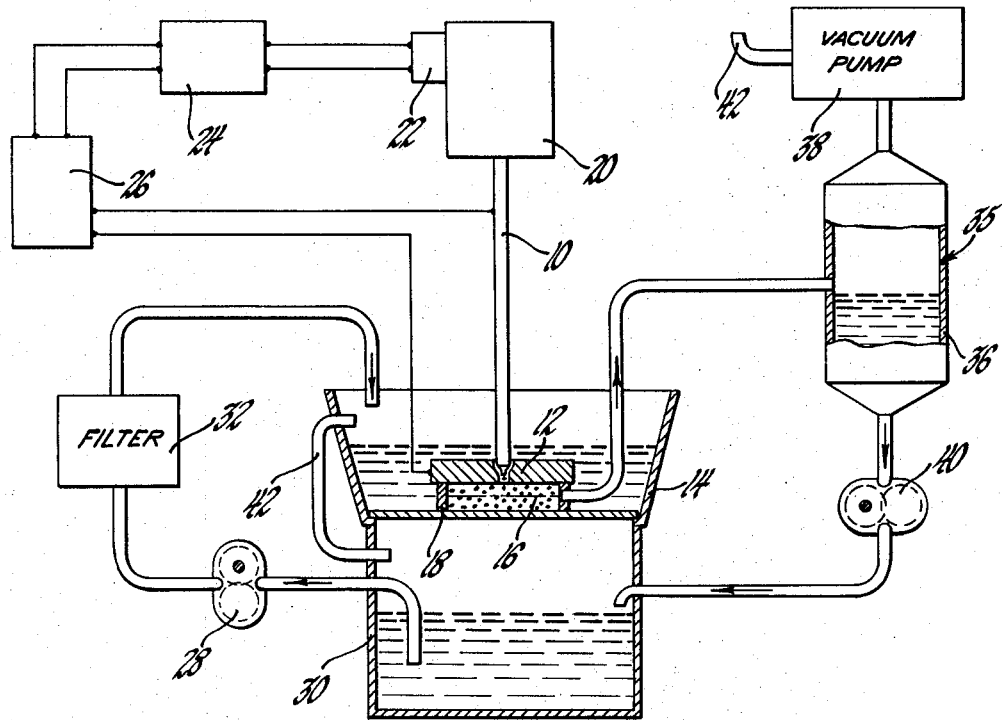
Figure 2:
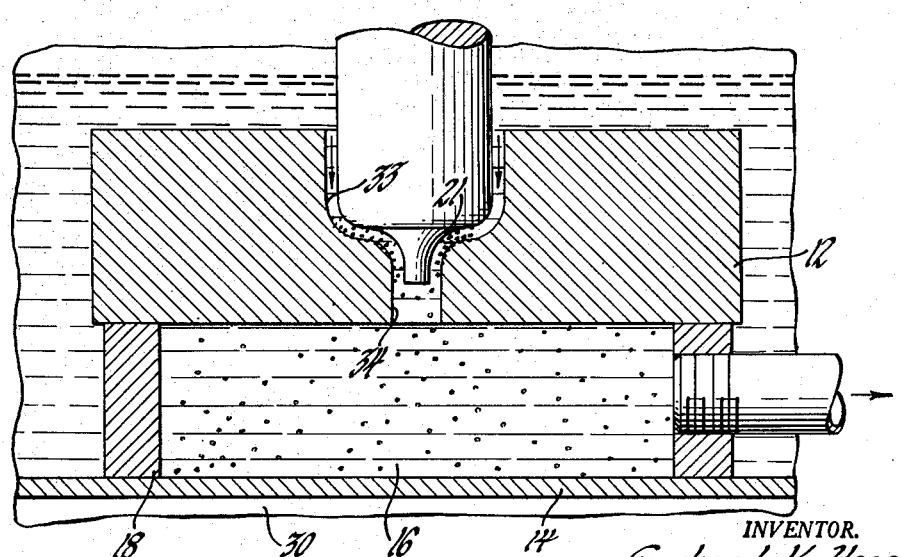

The foregoing and other objects and advantages of the invention will be apparent from the following description and the accompanying drawings in which:

FIGURE 1 is a diagrammatic view of the electrical stock removal apparatus incorporating the principles of the invention; and FIGURE 2 is an enlarged fragmentary view of a part of the apparatus.

Referring now to the drawings in detail and particularly to FIGURE 1, the numerals 10 and 12 denote, respectively, a cutting tool and a workpiece. The workpiece 12 is suitably fixedly mounted within a workpiece reservoir 14 containing clean dielectric fluid and forms the top portion of a sealed chamber 16. The remainder of this chamber 16 is defined by the bottom of the reservoir 14 and a member 18.

The machining of the workpiece 12 may be done by any suitable electrical stock removal apparatus such as that disclosed in the U.S. Patent No. 3,059,150 to Colten et al. Briefly, since a complete description is made in this patent, the cutting tool 10 and the workpiece 12 are spaced relative to each other by a servomotor 20 that maintains a certain machining gap 21 (see FIGURE 2) between the cutting tool 10 and the workpiece 12. If preferred, both the cutting tool 10 and the workpiece 12 can be maneuvered or only one moved and the other maintained fixed. This servomotor 20 may be of the piston type and fluid pressure operated in conjunction with a servo valve 22, which is in turn controlled by a gap spacing circuit 24. Power is supplied across the gap by a power supply 26 so that electrical discharges occur at time spaced intervals. These discharges cause particles to be eroded from the workpiece 12. The dielectric fluid in a well known way affords an ionized path for the discharges between the cutting tool 10 and the workpiece 12, which function as electrodes. The circuit 24 compares the voltage across the gap 21 with a desired reference voltage corresponding to the desired gap spacing and causes through the servo valve 22 the servomotor 20 to alter the spacing so that the proper gap voltage is maintained. This gap voltage, of course, may be varied with the particular material being machined.

The workpiece reservoir 14 is supplied with clean dielectric fluid by a suitable pump 28 that withdraws contaminated dielectric fluid from a main reservoir 30 and delivers this through a filter 32 to the workpiece reservoir 14. This clean dielectric fluid then flows along a machined surface 33 and to the gap 21, as viewed in FIGURE 2. By having the machined surface 33 always exposed to clean dielectric fluid, the problem of secondary erosion from contaminated fluid becomes no problem. This eliminates the objectionable taper and the impairing of the finish. This clean dielectric fluid moves into the gap 21 and washes away the eroded particles produced by the electrical discharges and from the gap 21 flows via a thru-opening 34 into the chamber 16.

During the machining process highly combustible gases are formed, particularly when machining large workpieces, such as dies with thru-openings where gas can accumulate beneath the workpiece, and because of the presence of sparks the danger of an explosion is always existent. It is therefore imperative that the gases be withdrawn and expelled quickly. This is accomplished by a suction system shown generally at 35. The suction system 35 includes a separating chamber as tank 36, the upper end of which has connected thereto a suction or vacuum pump 38, and at the lower end has a positive displacement pump 40. The pumps 38 and 40 may be of any known construction having their capacities correlated or adjustable to meet the conditions under which the apparatus is to be utilized. It is particularly desirable to have the capacity of the vacuum pump 40 adjustable for different applications of the apparatus. The vacuum pump 38 in operation causes the contaminated dielectric fluid having the eroded particles therein and the gaseous formations to be withdrawn from the chamber 16 and delivered to the separating tank 36. At the tank 36, the gaseous formation and the fluid are separated, the gaseous formations being permitted to expand and rise from the fluid and thereafter expelled through an outlet 42 for the vacuum pump 38 and the contaminated fluid being returned by the pump 40 to the main reservoir 30.

The levels of the fluids in the workpiece reservoir 14 and the main reservoir 30 are maintained by an overflow pipe 42. If the fluid is being transferred faster to the workpiece reservoir 14 than it is being returned to the main reservoir 30, the overflow pipe 42 will return the excess fluid to the main reservoir 30.

If the workpiece 12 does not have a thru-opening 34, a hollow cutting tool can be employed. The tank 36 then would be connected to an upper part of the hollow cutting tool in any suitable way.

From the foregoing, it can be appreciated that the flow system eliminates the explosion danger by quickly evacuating and separating the gaseous formations from the contaminated dielectric fluid. Additionally, the direction of flow of clean dielectric fluid facilitates close dimensional control and thereby permits the apparatus to be adapted for many diverse uses.

The invention is to be limited only by the following claims.

I claim:

1. Apparatus for generating electrical stock removing discharges across an ionizable fluid filled gap formed between cutting tool and workpiece electrodes comprising means supplying ionizable fluid to the gap for aiding in the removal of eroded particles from the workpiece electrode means positioned downstream from the gap for collecting the ionizable fluid from the gap containing the eroded particles and gaseous formations developed during the stock removal so that the gaseous formations cannot accumulate in the gap, and means withdrawing and separating the gaseous formations and the ionizable fluid containing the eroded particles and dissipating the gaseous formations so as to avoid explosions thereof.

2. Apparatus for generating electrical stock removing discharges across a dielectric fluid filled gap formed between cutting tool and workpiece electrodes comprising a fluid reservoir containing the workpiece electrode, means supplying dielectric fluid to the reservoir and accordingly to the gap for aiding in the removal of eroded particles from the workpiece electrode, a chamber for collecting the dielectric fluid proceeding from the gap and containing eroded particles and also gaseous formations from the gap, the chamber being arranged relative to the workpiece electrode so as to isolate the gaseous formations from the dielectric fluid in the reservoir, and a vacuum pump communicating with the chamber and so arranged as to withdraw the dielectric fluid containing the eroded particles and the gaseous formations from the chamber and the gaseous formations to be dissipated thereby avoiding explosions thereof.

3. Apparatus for generating electrical stock removing discharges across a dielectric fluid filled gap formed between cutting tool and workpiece electrodes comprising a fluid reservoir containing the workpiece electrode, means supplying clean dielectric fluid to the reservoir, a collection chamber so arranged relative to the workpiece as to collect the contaminated dielectric fluid containing eroded particles and gaseous formations from the gap and prevent the contaminated dielectric fluid from commingling with the clean dielectric fluid in the reservoir, a separating chamber communicating with the collection chamber, a vacuum pump communicating with the separating chamber and operative to transfer the dielectric fluid from the collection chamber to the separating chamber and thereafter expelling the gaseous formations separated from the contaminated dielectric fluid by the separating chamber so as to avoid an explosion of the gaseous formations, and means returning the contaminated dielectric fluid withdrawn by the vacuum pump to the reservoir.

4. A dielectric fluid flow system for electrical stock removing apparatus of a character for causing stock to be machined from a workpiece electrode by electrical discharges generated across an ionizable fluid filled gap formed between a cutting tool electrode and the workpiece electrode comprising a reservoir containing the workpiece electrode and the ionizable fluid, a sealed chamber arranged relative to the workpiece electrode so as to collect the contaminated ionizable fluid containing eroded particles and gaseous formations passing through the gap so as to isolate the gaseous formations from the ionizable fluid in the reservoir, and means withdrawing the contaminated ionizable fluid, the withdrawing means separating the gaseous formations from the ionizable fluid and thereafter dissipating the gaseous formations so as to avoid an explosion thereof and returning the ionizable fluid to the gap.

5. A dielectric fluid flow control system for electrical stock removal apparatus of a character for causing stock to be machined from a workpiece electrode by electrical discharges generated across a dielectric fluid filled gap formed between a cutting tool electrode and the workpiece electrode comprising a reservoir containing the workpiece electrode, means supplying clean dielectric fluid to the reservoir and in a direction corresponding to the direction stock is being removed from the workpiece electrode, a collection chamber positioned downstream from the gap for collecting contaminated dielectric fluid from the gap containing eroded particles and gaseous formations so as to prevent the contaminated dielectric fluid from commingling with the clean dielectric fluid in the reservoir, and suction means communicating with the chamber so as to withdraw the contaminated dielectric fluid therefrom and separate the gaseous formations from the contaminated dielectric fluid and thereafter dissipate the gaseous formations so as to avoid an explosion thereof and return the dielectric fluid to the supplying means.

6. A dielectric fluid flow control system for electrical stock removal apparatus of the character adapted to cause stock to be machined from a workpiece electrode by electrical discharges generated across a dielectric fluid filled gap formed between a cutting tool electrode and the workpiece electrode comprising main and secondary reservoirs, the workpiece electrode being positioned within the secondary reservoir, a pump for withdrawing dielectric fluid from the main reservoir and supplying the fluid to the secondary reservoir, a filter coacting with the pump so that the fluid delivered to the secondary reservoir is relatively celan, a sealed collection chamber so arranged relative to the workpiece electrode as to collect from the gap contaminated dielectric fluid containing eroded particles and gaseous formations and prevent the contaminated dielectric fluid from commingling with the clean dielectric fluid, and suction means for withdrawing the contaminated dielectric fluid from the chamber and separating the gaseous formations from the dielectric fluid to be separated and thereafter expelling the gaseous formations so as to avoid an explosion thereof and returning the dielectric fluid to the main reservoir.

7. Apparatus for generating electrical stock removal discharges across a dielectric fluid filled gap formed between cutting tool and workpiece electrodes comprising means supplying clean dielectric fluid to the gap so as to aid in the removal of eroded particles from the workpiece electrodes, the supplying means being so arranged that the clean dielectric fluid is caused to flow in the same direction as the stock is removed from the workpiece electrode, a sealed chamber arranged relative to the workpiece electrode so as to collect from the gap the contaminated dielectric fluid containing eroded particles and gaseous formations and prevent the contaminated dielectric fluid from commingling with the clean dielectric fluid, and means withdrawing the contaminated dielectric fluid from the chamber, the withdrawing means including a vacuum pump and a separation chamber, the vacuum pump being so arranged as to transfer the contaminated dielectric fluid from the sealed chamber to the separation tank and then exhaust the gaseous formations from the separating chamber so as to avoid an explosion thereof, and means for returning the contaminated dielectric fluid in the separating tank to the supplying means.

8. Apparatus for generating stock removing electrical stock removal discharges across a dielectric fluid filled gap formed between cutting tool and workpiece electrodes comprising an auxiliary reservoir including dielectric fluid and having the workpiece electrode mounted therein and immersed in the dielectric fluid, means supplying clean dielectric fluid to the auxiliary reservoir, the supplying means including a main reservoir, a pump, and a filter, the pump and the filter coacting to cause dielectric fluid to be withdrawn from the main reservoir, filtered and then supplied to the auxiliary reservoir, a sealed chamber arranged relative to the gap so that contaminated dielectric fluid from the gap containing eroded particles and gaseous formations is collected within the sealed chamber and prevented from commingling with the clean dielectric fluid, a separating tank joined to the chamber, a vacuum pump for transferring the contaminated dielectric fluid from the sealed chamber to the tank where the gaseous formations are separated from the dielectric fluid and dissipated by the vacuum pump so as to avoid an explosion thereof, and a pump arranged so as to return the dielectric fluid from the separating tank to the main reservoir.

References Cited in the file of this patent

UNITED STATES PATENTS

| | | |
|---|---|---|
| 2,526,423 | Rudorff | Oct. 17, 1950 |
| 2,818,490 | Dixon et al. | Dec. 31, 1957 |

UNITED STATES PATENT OFFICE
CERTIFICATE OF CORRECTION

Patent No. 3,144,540                          August 11, 1964

Gerhard K. Haas

It is hereby certified that error appears in the above numbered patent requiring correction and that the said Letters Patent should read as corrected below.

Column 1, line 18, for "is" read -- in --; column 2, line 43, for "gas" read -- gases --; line 62, for "formation" read -- formations --; column 3, line 20, after "trode" insert a comma; column 4, line 37, for "celan" read -- clean --; line 39, after "gap" insert -- the --.

Signed and sealed this 24th day of November 1964.

(SEAL)
Attest:

ERNEST W. SWIDER
Attesting Officer

EDWARD J. BRENNER
Commissioner of Patents